Figure 1:
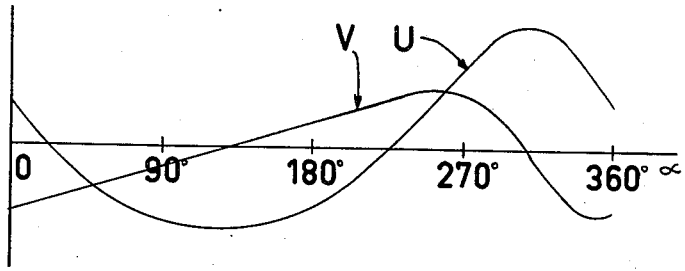

July 26, 1960  K. E. EVRELL  2,946,228
DEVICE FOR CONVERSION OF A PERIODICALLY IRREGULAR
ROTARY MOTION TO A REGULAR MOTION OR VICE VERSA
Filed Aug. 19, 1957  5 Sheets-Sheet 5

United States Patent Office 2,946,228
Patented July 26, 1960

2,946,228
DEVICE FOR CONVERSION OF A PERIODICALLY IRREGULAR ROTARY MOTION TO A REGULAR MOTION OR VICE VERSA

Kaleb Emil Evrell, Eskilstuna, Sweden, assignor to Aktiebolaget Bolinder-Munktell, Eskilstuna, Sweden Filed Aug. 19, 1957, Ser. No. 678,826

Claims priority, application Sweden Aug. 25, 1956

6 Claims. (Cl. 74—68)

The present invention relates to a device for converting a periodically irregular rotary motion to a substantially regular rotary motion or vice versa, and the invention is characterized by a main shaft for receiving or transmitting a periodically irregular rotary motion, the said shaft carrying a freely mounted circular transmission element for receiving or transmitting the said rotary motion, such as a pulley, a chain wheel, or a toothed wheel, which in turn at a distance from the main shaft carries a freely mounted first auxiliary shaft parallel with the main shaft which is rigidly connected with one end of a first link system, the other end of which is rotatable round a second auxiliary shaft eccentrically arranged in relation to the main shaft and forming a reference point, and rigidly connected to one end of a second link system, the other end of which is rigidly connected with the main shaft.

Many machines with rotating shafts have an irregular run, that is, the speed of rotation changes periodically. The value of the irregularity is the difference between the highest and the lowest angular velocity divided by the average angular velocity. Typical machines of this kind are reciprocating engines, combustion engines, piston compressors and saw frames, or generally machines which operate with reciprocating masses, usually in combination with periodically driving or braking forces.

The disadvantages are of several kinds when operation of an irregularly rotating operating machine or transmission of power from an irregularly operating drive motor to the operating machines to be driven, is concerned.

If for example an electric generator is to be driven by a one-cylinder combustion engine via a cone belt transmission, the cone belt will run unsteadily and will have to be overdimensioned in order to bear the strain to which it is subjected. The greatest disadvantage, however, is that a great part of the irregularity of the drive motor is transmitted to the generator, the result being that the current generated will have an extra variation of voltage with low frequency whereby it will be unfit for many purposes.

Besides, if a saw frame is to be driven by cone belt transmission from an electric 3-phase motor, there will, in addition to the abovementioned difficulty with the cone belt drive which is well fitted for other purposes, often be such disturbances in the electric distribution network, that this cheap drive means cannot be used.

By providing a machine with a large flywheel it is possible theoretically to reduce these irregularities to nearly any degree. However, in practice it appears that there will be such great masses and difficult bearing constructions that it is not economically possible to solve the problem in this way. Moreover there will be such great difficulties of starting and stopping the machine, that this makes the whole thing impossible.

Figure 2:
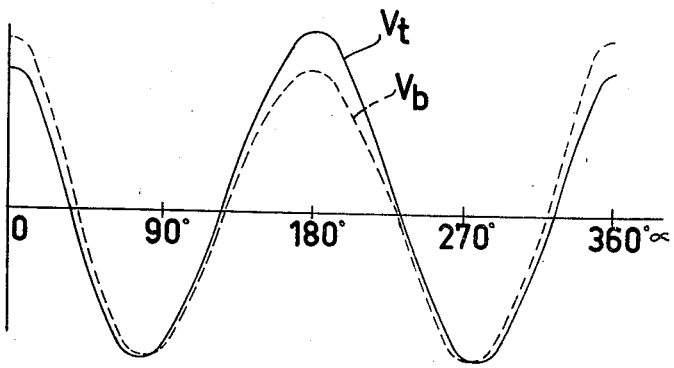
Figure 3:
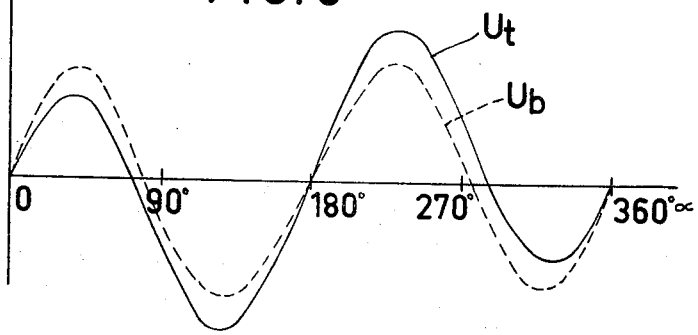
Figure 4:
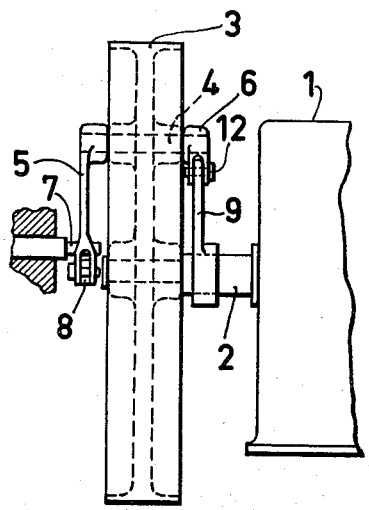
Figure 5:
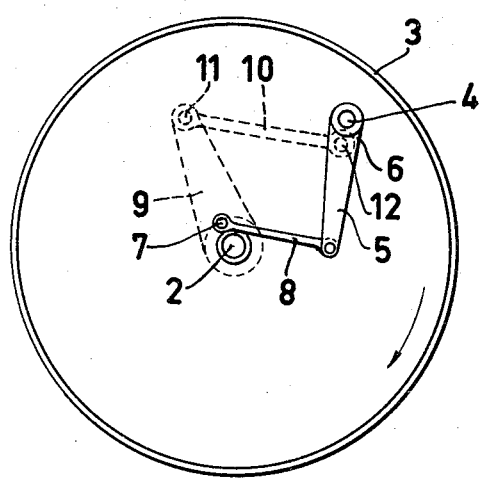
Figure 6:
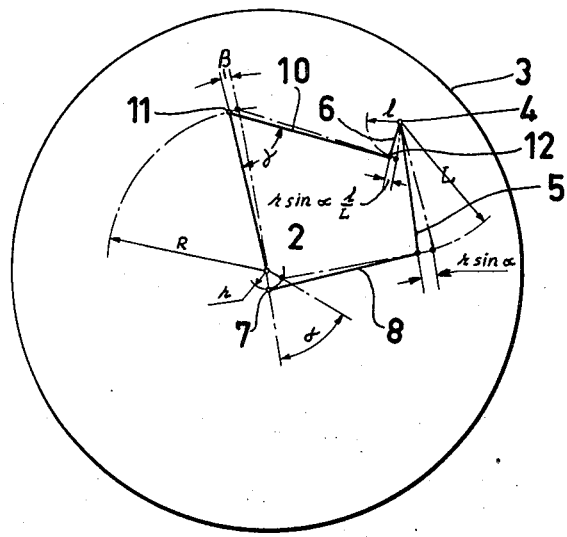
Figure 7:
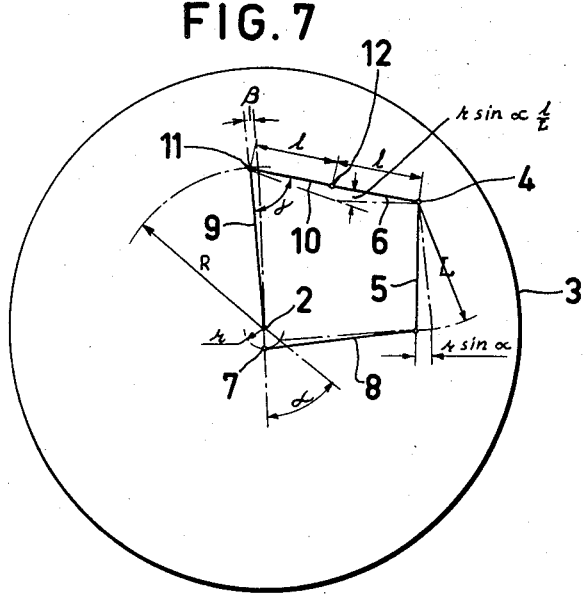
Figure 8:
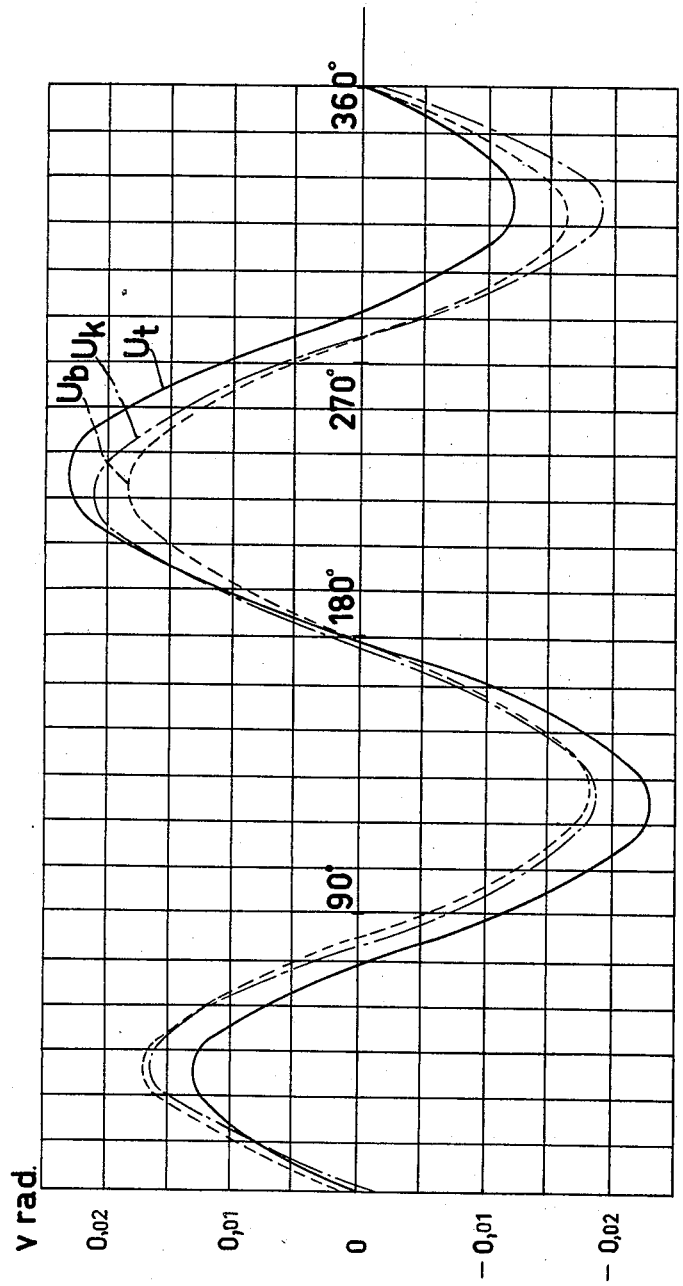
Figure 9:
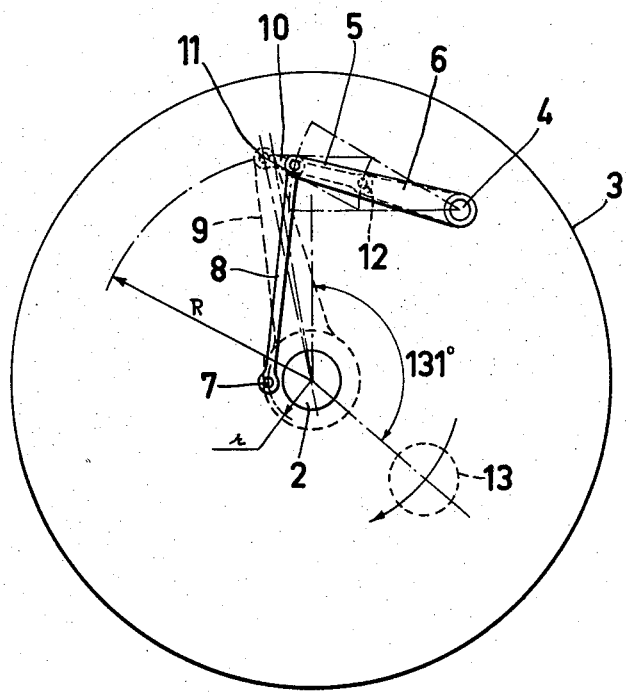

However, according to the present invention a compensation for such irregularities of the rotary motion can be effected in a simple and effective manner. The invention will now be described more in detail, the accompanying drawings being referred to, in which Fig. 1 shows curves of angle deviation and relative angular velocity for an air compressor, as a function of the position of its crankshaft. Fig. 2 shows curves of the relative velocity for a frame saw, when idle and loaded, as a function of the position of the appurtenant crankshaft. Fig. 3 shows the angle deviation for the frame saw in both conditions of operation of Fig. 2. Figs. 4 and 5 show a side view and a front view respectively of an embodiment of the invention. Figs. 6 and 7 show diagrammatically two different embodiments of the link system of the device. Fig. 8 shows curves of the angle deviation for a frame with and without compensation respectively. Fig. 9 shows a front view of an embodiment of the invention with a link system of the type shown diagrammatically in Fig. 7, and in Fig. 10 an auxiliary contrivance for the device is shown.

If, on the shaft of an irregularly rotating machine a plain disc is mounted of such small weight that it does not influence the rotation, and if another disc is provided abreast with and concentric with the first one, which second disc rotates at unchanged speed with the average speed of the machine, and which therefore hereinafter will be referred to as "seismographic mass," then the first mentioned disc will rotate periodically faster and periodically slower than the seismograph mass. The thus periodically varying difference of angle, hereinafter called "angle deviation," will depend upon the magnitude of the periodically acting forces.

If a one-cylinder single-acting air compressor which operates with constant counter pressure is taken as an example, the amplitude will follow the same laws revolution by revolution of the crankshaft, and the conditions will be approximately as shown in Fig. 1 with one complete rotation per revolution of the compressor. In Fig. 1 the zero line represents the seismographic mass and $\alpha$ represents the position of the crankshaft. It will be seen that the curve for the relative angular velocity V as well as the corresponding 90° phase displaced curve for the angle turning U will have a sine curve form.

That the phase displacement will be about 90° will be easily understood from the fact that the relative angular velocity decreases with increasing angle deviation and vice versa and also changes signs at the turning points of the deviation.

If as another example a saw frame is chosen in which a number of sawblades are stretched in a frame moving up and down when the flywheel or crankshaft of the frame has two maximum and two minimum velocities of rotation during one revolution. The maximum velocities are obtained at those positions of the crank, where the loose frame turns, and the minimum velocities are obtained when the loose frame has its maximum speed. That this is the case is easily understood by considering that the total amount of kinetic energy cannot be considerably changed during one revolution and that, at the turning point of the loose frame, it lies entirely in the motion of the rotating masses. If such a saw frame is running idle it is only necessary to supply from the motor that power that corresponds to the friction losses. If the operation can be so perfectly arranged that the supply of energy is constant during the whole revolution, the amount of kinetic energy in the movable parts will be greater at the lower turning point of the loose frame than in the upper one, due to the fact that at the lower turning point there is as much greater amount of kinetic energy as the weight of the loose frame multiplied by the length of stroke. There by also the corresponding increase of the angular velocity at the lower turning point is obtained.

Then the relative angular velocity at idle running will greatly vary in accordance with the curve $V_t$ in Fig. 2, with greater amplitude at 180° than at 0°. The degrees of the crank $\alpha=0$ and $\alpha=360°$ correspond to the position when the crankarm points directly upwards.

When the saw frame is fully loaded, there will be consumed during the stroke of the saw, that is, a crank angle of 0–180°, considerably more energy than the additional energy obtained from the potential delivery of energy of the loose frame and the contribution of the drive motor during the same period, and the result will be that in this case the angular velocity will be less for $\alpha=180°$ than for $\alpha=0°$ ($=360°$). Therefore the relative angular velocity will vary during a full revolution in accordance with the dashed curve $V_b$ in Fig. 2. If, through calculation or direct measurement with a cathode beam oscillograph an examination is made as to how the crankshaft of a saw frame rotates in relation to a seismographic mass, it will appear that the angular deviation for both conditions of operation analysed above, that is, idle running and full load, will vary in accordance with the curves $U_t$ and $U_b$ in Fig. 3.

A compensation device according to the following cannot entirely equalize the speed of the drive pulley of a saw frame owing to the fact that the course of rotation depends upon the degree of load, but it is possible to reduce the amplitudes of rotation to such small values that they will be of no practical importance.

In Fig. 4 is shown diagrammatically a side view of a compensation coupling intended to equalize a sine curved shaped torsional oscillation with a full cycle of oscillation per revolution of the machine.

Fig. 5 shows the same device seen towards the shaft end. Reference numeral 1 designates a drive motor or operating machine, the mode of operation of which is such that to its shaft 2 a forced irregularity is imparted during the run.

Reference numeral 3 designates a pulley or a toothed wheel by means of which the machine 1 drives or is driven by another machine at a uniform speed. The wheel 3 is turnably mounted on the shaft 2 and has in turn a shaft 4 turnably mounted in the body of the wheel. On that side of the wheel 3 that is remote from the machine 1 an arm 5 of a length L is rigidly connected to the shaft 4 and on the other side of the machine an arm 6 is rigidly connected to the said shaft. The free end of the arm 5 is held at a constant distance from a pin 7 rigidly anchored in the foundation, by means of a link 8. The free end of the arm 6 and an arm 9 rigidly connected to the shaft 2 are coupled together by means of a link 10 and bolts 11 and 12.

This embodiment of the invention acts in the following manner. The wheel 3 is supposed to be driven at a constant uniform speed. Referring to Fig. 5 and supposing that the wheel 3 is at rest and that instead the stationary pin 7 rotates uniformly round the centre of the wheel 3, which implies the same relative motion, it is evident that the link 8 due to the action of the eccentric pin 7 will swing the arm 5 mounted in the resting wheel 3 via the shaft 4 to and fro once for each revolution of the pin 7. The shaft 4 rigidly connected to the arm 5 thus will rock to and fro in its bearing in the wheel 3. This periodical oscillation is transmitted by the arm 6 on the other side of the wheel 3, which arm then via the link 10 will exert a reciprocating force on the upper end of the arm 9 rigidly connected with the machine shaft 2. Thereby the said arm 9 will turn the shaft 2 to and fro periodically, so that the said shaft makes a complete oscillating motion for each revolution of the uniformly rotating pin 7. If now the real condition of rotation is considered, that is, uniform rotation of the wheel 3 in relation to the stationary pin 7, the recently described reciprocating oscillation of the shaft 2 relatively to the wheel 3 implies that at the uniform rotation of the said wheel, the shaft 2 will participate in the rotary motion under periodically changing phase displacement from the constant angular velocity of the wheel with the same frequency as the number of revolutions as the wheel.

In Figs. 6 and 7 is shown how the angle deviation can be calculated for two different embodiments of the invention.

Fig. 6 shows the geometry for the compensation device in Figs. 4 and 5. It is supposed that the pin 7 rotates in clockwise direction, as shown in Fig. 5. As in the description of the mode of operation it is supposed that the motor 1 is resting, while the pin 7 rotates in the opposite direction round the centre of the shaft 2. The relative motion between the wheel 3 and the pin 7 then will, as mentioned, be as in reality. The arm 9 connected to the machine shaft 2, makes, when the pin 7 has turned an angle $\alpha$ relatively to the wheel 3 an angle deviation $\beta$ the magnitude of which approximately will be $$\beta = \frac{r}{R}\frac{l}{L}\frac{\sin \alpha}{\sin \gamma}$$

radians. As $\sin \gamma$ for $\beta$-values varies very little one may say $\beta = \text{constant} \times \sin \alpha$, or expressed in words: For each revolution of the pin 7 ($\alpha=0$–360°) the shaft 2 will thus display an approximately sine-shaped oscillation with an amplitude determined by the eccentricity of the link system and the pin 7, which, with regard to pin 7 and uniformly rotating disc 3 implies an essentially sine-shaped fluctuations of the angular velocity of the shaft 2 for each revolution of the disc 3. As already mentioned and shown in Fig. 1 a one cylinder compressor shows a substantially sine-shaped fluctuation of the angular velocity characteristic and therefore the geometry shown in Fig. 6 can be used for transformation of motion between a uniformly rotating drive motor and such a compressor for compensation of the irregularity.

Fig. 7 shows the geometry for a compensation device, which is of such a kind that when the arm 5 is in medium position, the arm 6 and the link 10 are rectilinear in relation to each other. In order to show in a simple manner how the compensation device acts, a diagram is shown where the arm 6 as well as the link 10 have the length $l$. The relative motion is imagined as in Fig. 6. The shortening of the centre distance between the shaft 4 and the joints 11 can, provided that $l$ is great in relation to the deviation $$r \sin \alpha \frac{l}{L}$$

be said to be $$\beta R \sin \gamma = r^2 \sin^2 \alpha \frac{l}{L^2} \times 2$$

the result being $$\beta = \frac{r^2 l \times 2}{RL^2 \sin \gamma} \sin^2 \alpha$$

Even in this case $\sin \gamma$ varies so little for small $\beta$-values that without great errors one can consider $\sin \alpha\gamma$ as a constant and then $\beta = \text{constant} \times \sin^2 \alpha$, but $$\sin^2 \alpha = \frac{1}{2} - \frac{1}{2}\cos 2\alpha$$

and as the cosinus function after a suitable phase displacement is identical with the sinus function one may state $\beta = f(\sin 2\alpha)$ in which $\alpha$ has another zero position than shown in Fig. 7.

A compensation device with geometry according to Fig. 7 can thus equalize a cyclic irregularity with two full and equally great cycles of oscillation per revolution of the machine. Besides, that the shaft 2 will make two oscillations per revolution of the machine can be read from Fig. 6. As the shaft 4 as stated above makes a full rocking movement for each revolution of the wheel relatively to the pin 7, and as the arm 6 connected to the shaft 4 is arranged, in the medium position of the rocking movement, to be in alignment with the link 10 actuating the shaft 2 via the arm 9, this link, each time the arm 6 swings from its medium position to one external position and back to the medium position, will be swung to and fro once. This is repeated when the arm 6 swings to its other external position and back to the medium position, and thus to the shaft 2 are imparted two oscillations for each revolution of the wheel 3 relatively to the pin 7.

Often it is necessary to compensate for a less regular course of oscillation. Through a suitable dimensioning of the units included it is possible to compensate for rather varying deviation amplitudes. In Fig. 8 is shown a practical example of the angle deviations for a saw frame with the following main data: Length of stroke: 600 mm., length of crankshaft: 2000 mm. and with 325 revolutions per minute. The total mass of oscillating parts (loose frame with sawblade and stretching devices et cetera) is 480 kg. and the polar moment of inertia of the parts rotating with the crankshaft is 290 kgm.$^2$. The drive pulley which in Figs. 4 and 5 is designated by 3 has a polar moment of inertia of 120 kgm.$^2$. The angle deviations are expressed in radians.

The curve $U_t$ shows the angle deviation $v$ for the crankshaft of the saw frame at idle running, the curve $U_b$ shows the same at top load and the curve $U_k$ shows the compensation or adaptation obtained with the device according to Fig. 9 which in principle operates in accordance with Fig. 7. Empirically the dimensions are so chosen that the compensation curve will have its maximum and minimum deviations at those angles of the crank, when the oscillations of the saw have corresponding greatest deviations.

Fig. 9 is drawn according to scale and $r=87$ mm., the length of the link is 423 mm., the length L of the arm 5 is 337 mm., the length $l$ of the arm 6 is 200 mm., which also is the length of the link 10, and the length R of the arm 9 is 447 mm., which also is the centre distance between the shafts 2 and 4. The relative position shown for the details included, where the arm 6 and the link 10 are in alignment with each other and where the arm 5 moves towards the centre, corresponds to the position where the main crank 13 of the saw frame has moved 131° in the direction of the arrow from its uppermost position. The compensation is intentionally so made that it will be at its best at top load, when the transmission of power is most strained.

Without loading the saw frame with any extra masses it is possible, with the device shown to reduce the irregularity from $\frac{1}{20}$ at idle running as well as at load to $\frac{1}{120}$ at idle running and about $\frac{1}{250}$ at top load.

The drive means for the saw frame will as a whole be cheaper with the device than without the device, because in the former case one can drive the frame 5 with cone belts instead of 8 and yet the transmission of force will live longer.

As shown above such irregularities as show one or two cyclic oscillations per revolution of machine can be equalized by means of compensation devices according to the two basic forms of Figs. 6 and 7. By modifying the geometry of the device it is also possible to master oscillations, the angle deviations of which differ greatly from the sine course.

If one wishes to compensate for oscillations with another frequency than one or two oscillations per revolution of the machine, this is possible by not rigidly connecting the pin 7 to the foundation, but instead letting it be a crank pin of a shaft guided by the rotation of the wheel 3. Thus, if the pin 7 is caused to rotate in the same direction as the wheel 3 with a fraction of the speed of the latter, it is easily understood from the above as to the dependence of the oscillation frequency upon the relative speed between the wheel 3 and the pin 7, that the oscillation of the shaft 4 and thus also the shaft 2 is slower than if the pin 7 were at rest. On the other hand the oscillation is quicker if the pin 7 under otherwise the same conditions is caused to rotate in the opposite direction of the wheel 3.

Figure 10:
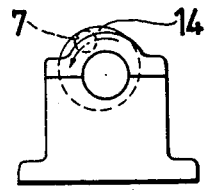

An extra means intended for this frequency conversion is shown in Fig. 10. It is supposed that for each revolution of the wheel 3 a shaft 14 with the crank pin 7 is driven $u$ revolutions in the opposite direction by means of a gear device, not shown. If the wheel 3 rotates with $n$ revolutions per minute in one direction, the shaft 14 thus will rotate $u \times n$ revolutions in the opposite direction. If $K_I$ is the number of full compensation oscillations per revolution of the machine in the embodiment according to Fig. 6 with movable pin 7 and $K_{II}$ is the corresponding number according to Fig. 7, the result will be:

$$K_I = 1 + \mu$$
$$K_{II} = 2 + 2\mu$$

If for example one wishes with a device according to Fig. 6 to compensate for the irregular driving from a one-cylinder four-stroke combustion engine, which has a full torsion oscillation per two revolutions of the motor, that is, half an oscillation per revolution, the result will be:

$$K_I = \tfrac{1}{2} = 1 + \mu \text{ from which follows } \mu = -\tfrac{1}{2}$$

If the motor makes $n$ revolutions per minute, the shaft 14 shall thus be driven $\tfrac{1}{2}n$ revolutions per minute, but as $\mu$ was $-\tfrac{1}{2}$, the direction of rotation shall be the same as that of the wheel 4.

It is evident that a compensation device made so that it equalizes a determined amplitude cannot entirely eliminate the irregularity of the wheel 3 if the natural oscillation amplitudes of the machine are different at varying load, but even a far from complete equalization, however, reduces the degree of irregularity to a fraction of the original one.

The invention is of course not restricted to the embodiments shown and described. For example the link systems can be modified so that other periodical courses than those shown can be obtained. Likewise the link systems, if desired or if required, may be placed at the same side of the wheel 3 instead of, as shown, be placed on either side of the wheel.

What I claim is:

1. A device for the conversion of a periodically non-uniform rotary motion into a substantially uniform rotary motion or vice versa, comprising a main shaft adapted to have a periodically non-uniform rotary motion, a circular transmission element coaxially mounted for free rotation upon said main shaft and adapted to have a substantially uniform rotary motion, a first auxiliary shaft rotatably mounted in said circular transmission element parallel to and radially spaced from said main shaft, a second auxiliary shaft parallel to and eccentrically arranged with respect to said main shaft, said second auxiliary shaft constituting a reference point, first linkage means connecting said first auxiliary shaft to said second auxiliary shaft comprising a first lever extending radially from said first auxiliary shaft and rigidly secured to the same and a link pivotally connected at one end to said lever and at the other end to said second auxiliary shaft, and second linkage means connecting said first auxiliary shaft to said main shaft comprising a second lever rigidly extending radially from said first auxiliary shaft, a third lever rigidly extending radially from said main shaft, and a link pivotally connected at one end to said second lever and at the other end to said third lever.

2. A device according to claim 1, characterized in that the second auxiliary shaft is fixed at a point outside the movable system.

3. A device according to claim 1, characterized in that the second auxiliary shaft is arranged, during the operation of the device, to rotate around the geometrical axis of the main shaft at a substantially uniform speed.

4. A device according to claim 3, characterized in that the second auxiliary shaft is arranged to be driven from the transmission element.

5. A device according to claim 1, characterized in that the members of the second link system are mutually so dimensioned and arranged, that the lever radially extending from the first auxiliary shaft forms a substantially right angle with its associated link, when the rotatable auxiliary shaft occupies its medium position.

6. A device according to claim 1, characterized in that the components of the second link system are mutually so dimensioned and arranged that the lever radially extending from the first auxiliary shaft, in the medium position of the rotatable auxiliary shaft, is substantially in alignment with its associated link.

References Cited in the file of this patent

FOREIGN PATENTS

| | | |
|---|---|---|
| 319,730 | Germany | Mar. 29, 1920 |
| 520,771 | Germany | Mar. 14, 1931 |
| 911,687 | Germany | May 17, 1954 |
| 60,526 | Sweden | Apr. 14, 1925 |